United States Patent [19]

Warnock

[11] 4,360,006
[45] Nov. 23, 1982

[54] ENERGY RADIANT SOLAR COLLECTOR
[75] Inventor: Stuart E. Warnock, Rankin, Ill.
[73] Assignee: Solar Search Corporation, Rankin, Ill.
[21] Appl. No.: 248,715
[22] Filed: Mar. 30, 1981
[51] Int. Cl.³ .............................................. F24J 3/02
[52] U.S. Cl. .................................... 126/449; 126/450
[58] Field of Search ............... 126/432, 449, 448, 445, 126/446, 450; 29/157.3 D, 521, 514, 505

[56] References Cited

U.S. PATENT DOCUMENTS

| | | | |
|---|---|---|---|
| 4,038,969 | 8/1977 | Smith | 126/429 |
| 4,084,575 | 4/1978 | Nicewonger | 126/446 |
| 4,154,223 | 5/1979 | Lof | 126/450 |
| 4,166,445 | 9/1979 | McGraw | 126/432 |
| 4,262,659 | 4/1981 | Breezinski | 126/449 |
| 4,279,066 | 7/1981 | Riley | 29/157.3 D |

FOREIGN PATENT DOCUMENTS 2828170  1/1980  Fed. Rep. of Germany ...... 126/449

*Primary Examiner*—James C. Yeung

[57] ABSTRACT

A solar energy receiving surface comprises a flat base plate of aluminum to which are affixed aluminum absorbers that are semi-elliptical or oval in shape connected to form a honeycomb-like pattern. The configuration of the absorber produce maximum solar yield per day and season by acting as a normal plane to the sun throughout the solar day and by scattering the sun's rays inbound to the absorber and base plate.

2 Claims, 7 Drawing Figures

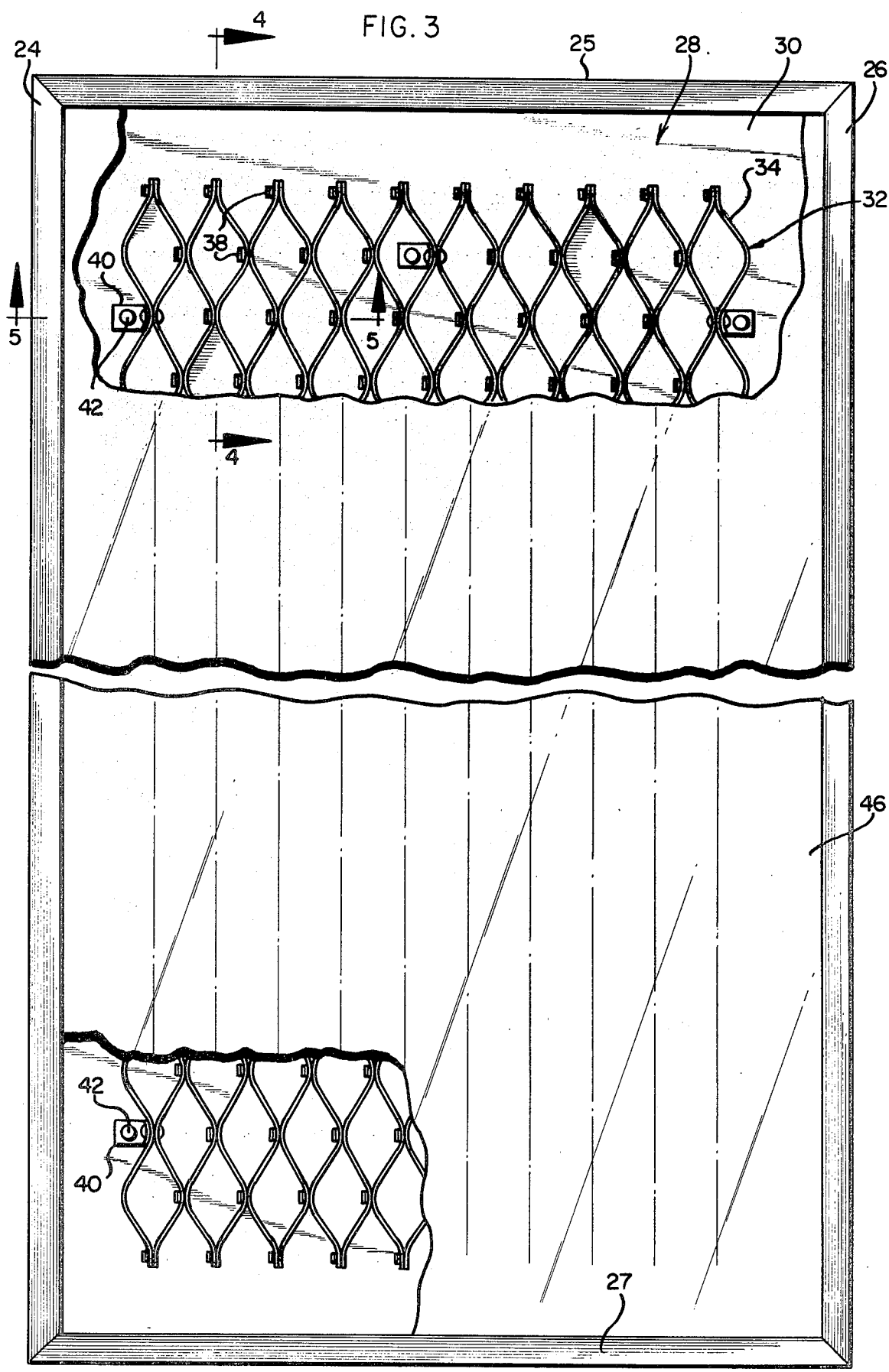

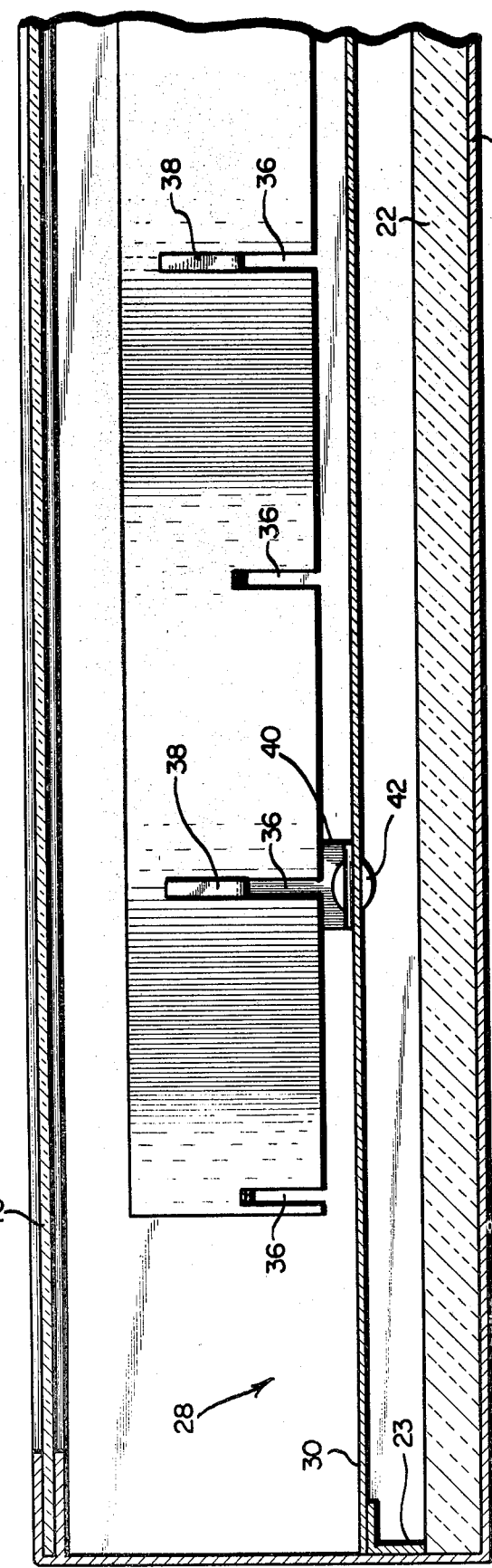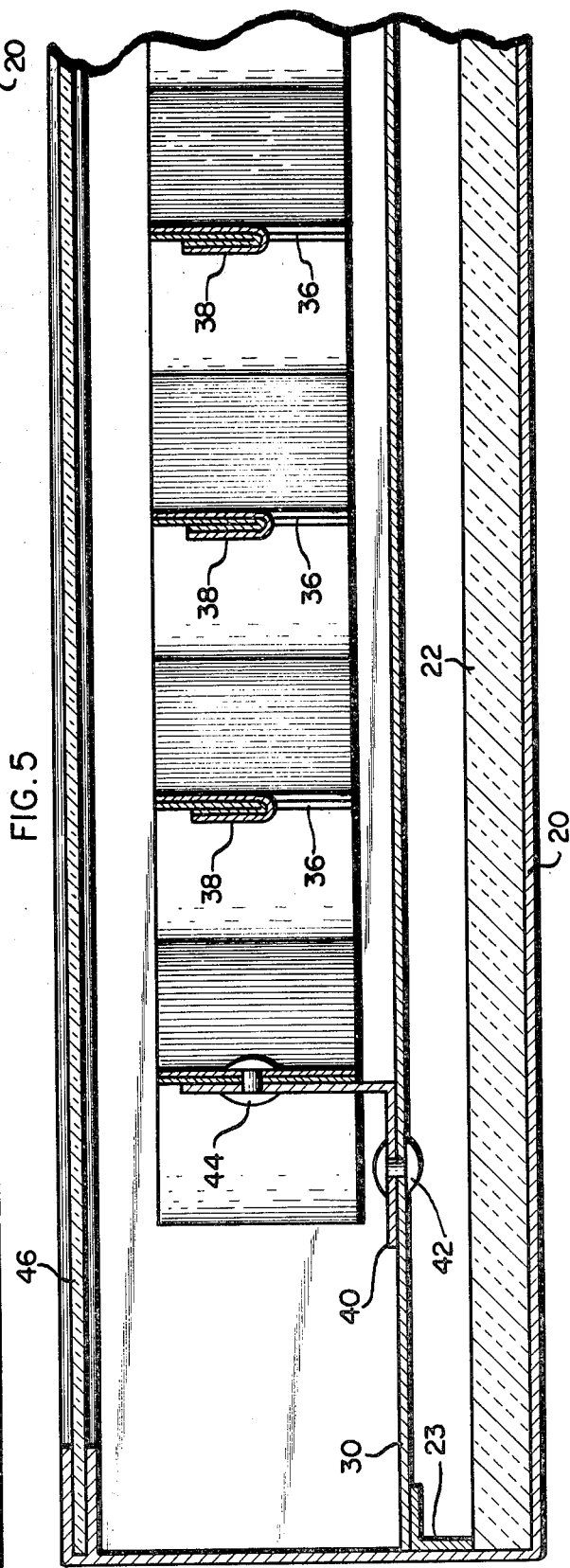

ENERGY RADIANT SOLAR COLLECTOR

BACKGROUND OF THE INVENTION

This invention relates to an improved radiant solar energy collector for heating a fluid such as air having increased efficiency in the transfer of solar energy falling on the collector to the fluid, and to the method of assembling the radiant solar energy collector.

With the decreasing supply and, consequently, high cost of conventional fuels, increased attention is being given to solar energy as a substitute, at least in part, for other fuel sources for use in space heating homes and other structures. Many of the solar energy generators proposed for use in such applications are similar in their principle of operation. Typically, such a solar energy generator comprises a sheet of glass or other material which is transparent to the heat rays of the sun and which forms one side of a conduit for fluid flow. Below the transparent sheet, within the conduit, is positioned a heat-conducting sheet or plate having a coating of a suitable dark material which absorbs the solar radiant energy which passes through the transparent sheet and converts the radiant energy, causing the temperature of the plate to rise. A fluid, typically air or other gas, is passed through the conduit and is heated by contact with the energy-absorbing plate within the assembly. The heated stream of fluid which leaves the generator is then used in appropriate conventional fashion for heating a home or other building, or grain conditioning.

The suitability of a solar heat generator of this type as a substitute for other energy sources depends on the efficiency with which the solar energy is collected and transferred to the stream of fluid, and also on the amount of power necessary to keep the stream of fluid moving through the generator. It is, of course, desirable to maximize the rate of heat transfer from the energy-absorbing plate to the fluid stream while minimizing the amount of power required to pass the fluid through the solar heater. The design of a solar heat generator which will achieve simultaneously both of these objectives presents a problem, however, since the conditions which tend to increase one effect tend to reduce the other. Thus, in order to maximize the rate of heat transfer between the energy-absorbing plate and the stream of fluid, the area available for heat transfer from the plate to the fluid should be relatively high. Typical prior radiant solar energy collectors are disclosed, for example, in U.S. Pat. Nos. 4,019,494; 4,062,346; 4,178,911; 4,191,170; and 4,201,195, as well as others. While many of these systems and/or apparatus disclosed in these and other prior patents generally are operable and function to transfer the solar energy falling on the assembly to a gas stream, the industry is still striving to improve upon the efficiency and the cost of such systems and/or apparatus.

Accordingly, it is an object of the present invention to provide a low-cost, efficient, radiant solar energy collector.

A further object is to provide an improved radiant solar energy collector for collecting radiant solar energy which is readily adaptable to a surface which points in substantially any direction and inclined at optimum angles to horizontal or level while still providing the efficient collection of radiant energy.

A still further object is to provide an improved radiant solar energy collector which provides structural rigidity and lightweight construction.

Further still, it is an object to provide improved methods for fabricating such a radiant solar energy collector.

SUMMARY OF THE INVENTION

As indicated above, this invention relates to an improved radiant solar energy collector and to improved methods for fabricating such radiant solar energy collectors.

In accordance with the present invention, the radiant energy solar collector is constructed as a self-contained unit having an insulated base, an energy receiving surface positioned adjacent the insulated base, and a heat exchange fluid conduit for circulating a heat exchange fluid in contact with the energy receiving surface. Other conduits are provided to introduce a heat exchange fluid and to receive or collect the fluid after it has been in contact with the energy receiving surface. A top or cover of the unit is a radiant energy transparent surface positioned in spaced relationship adjacent the energy receiving surface. Side walls provide a self-contained unit and permit mounting of the unit on a surface. The energy receiving surface comprises a flat base plate of aluminum to which are affixed aluminum absorbers that are semi-elliptical or oval in shape connected to form a honeycomb-like pattern. The configuration of the absorbers produce maximum solar yield per day and season by acting as a normal plane to the sun throughout the solar day and by scattering the sun's rays inbound to the absorbers and base plate. The absorbers further are affixed to the base plate in spaced relationship to the latter to insure high energy extraction with minimum friction so as to minimize the power required for moving the heat exchange fluid. Also, in accordance with the invention, a stair-step energy receiving surface design is provided that permits the energy receiving surface to stand or lay at nearly any angle and have the absorbers pointed directly toward the winter sun, for maximum heat gain. In fabricating the energy receiving surface, a problem of assembling and fabricating the energy receiving surface economically is resolved by utilizing eyelets and the metal comprising the absorbers themselves.

The invention accordingly comprises the radiant solar energy collector possessing the construction, combination of elements and arrangement of parts which are exemplified in this disclosure and the scope and application of which will be indicated in the claims.

DESCRIPTION OF THE PREFERRED EMBODIMENT

For a fuller understanding of the nature and desired objects of the invention, reference should be had to the following detailed description taken in connection with the accompanying drawings wherein like reference characters denote corresponding parts throughout the several views, and wherein:

FIG. 3 is a top plan view of a radiant solar energy collector exemplary of the invention, partially sectionalized and broken away to illustrate the construction and arrangement of the energy receiving surface thereof;

FIG. 4 is a sectional view taken generally along lines 4—4 of FIG. 3;

FIG. 5 is a sectional view taken generally along lines 5—5 of FIG. 3;

Figure 1:
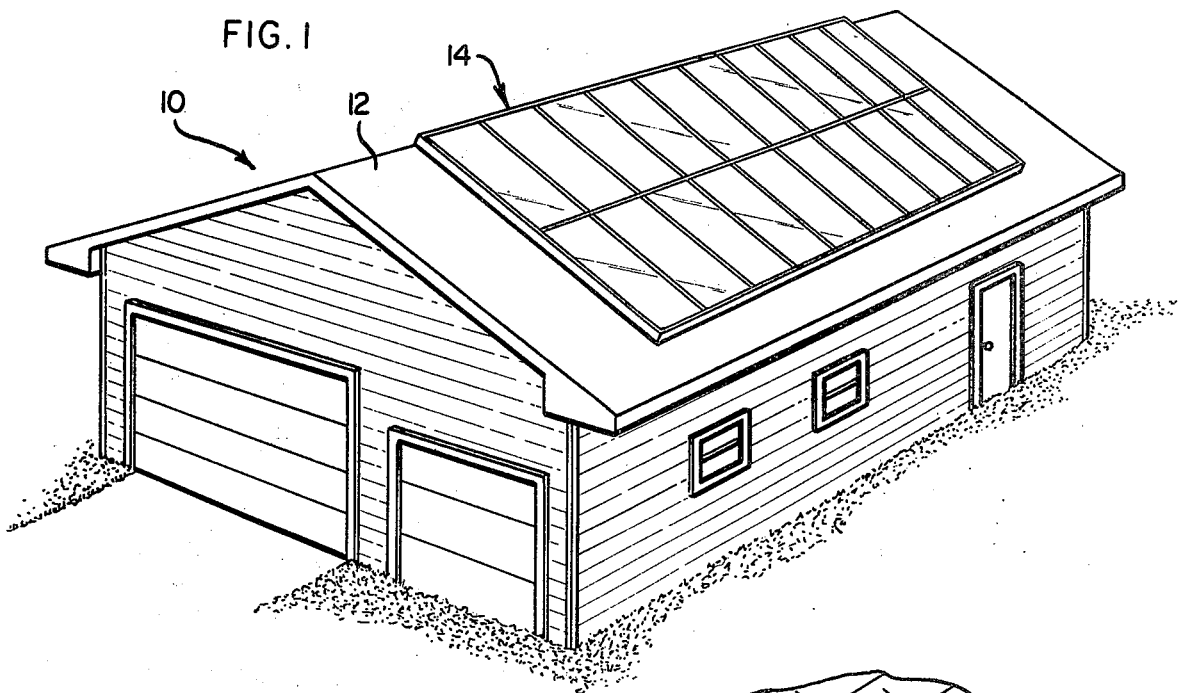
FIG. 1 is a perspective view of an embodiment of the invention illustrating a radiant solar energy collector as applied to a roof structure.
Figure 2:
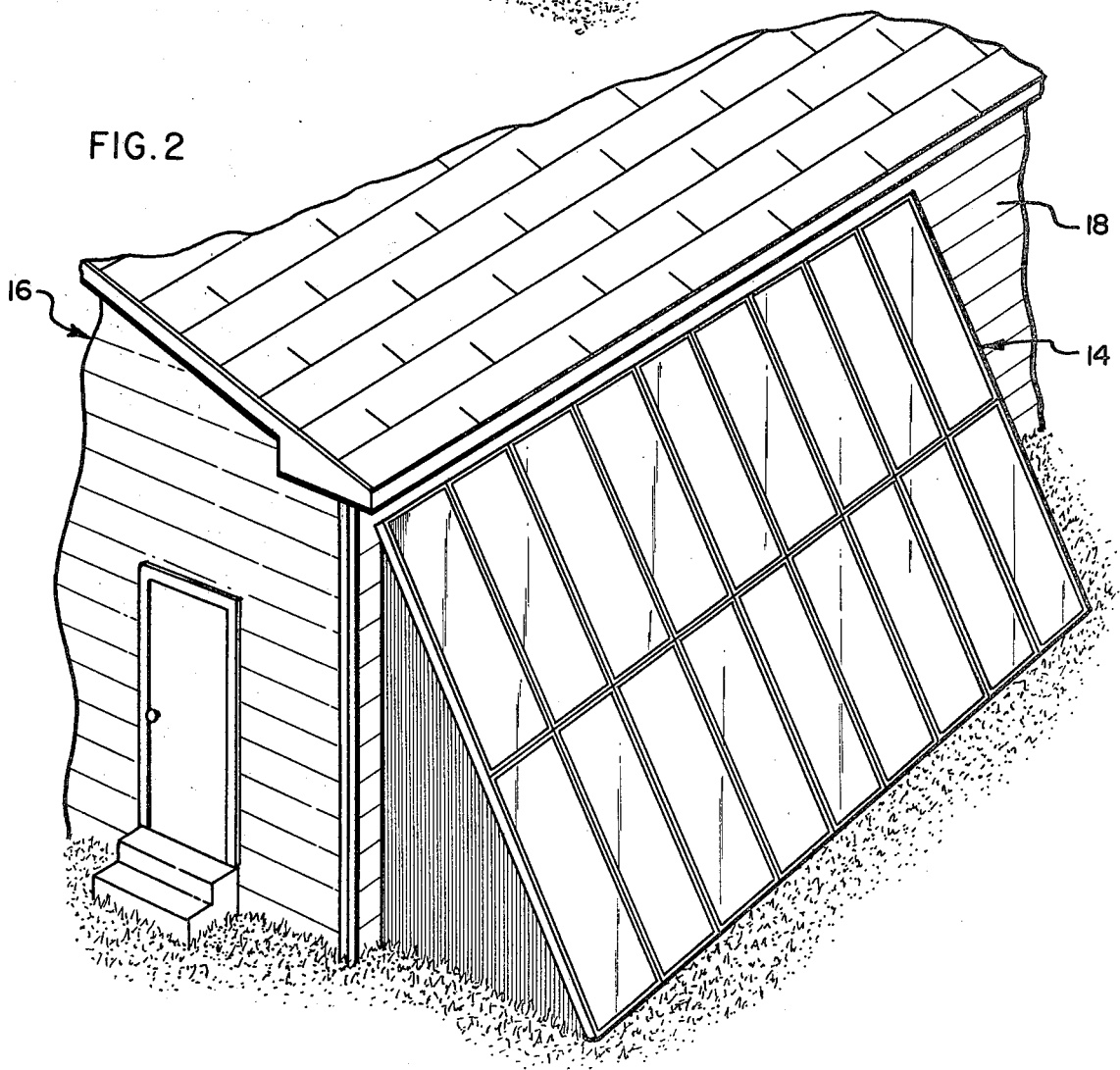
FIG. 2 is a partial perspective view of an embodiment of the invention illustrating a radiant solar energy collector as applied to a side wall structure of a building.

Referring now to the drawings, in FIG. 1 there is illustrated a solar collector unit 14 exemplary of the invention, as it may be applied to a roof 12 of a building 10. Correspondingly, in FIG. 2, a similar solar collector unit 14 is illustrated as it may be applied to the side wall 18 of a building 16. The solar collector units 14 are constructed as a self-contained unit for attachment to the roof 12 or side wall 18 of a building, and conduits (not shown) are provided to introduce a heat exchange fluid and to receive or collect the fluid after it has been in contact with the energy receiving surface 28 of the solar collector units 14, so that the heated stream of fluid can be utilized to heat a home or other building, or for grain conditioning.

A solar collector unit 14, as can be best seen in FIGS. 3-5, is a self-contained box-like structure having a bottom wall 20, side walls 24–27 and a transport cover 46, all constructed and assembled so as to form an enclosure which forms a conduit for fluid flow, typically air or other gas, as more particularly described below. Insulation 22 is provided on the bottom wall 20, and an energy receiving surface 28 is supported in spaced relation from the insulation 22 and the bottom wall 20 by means of L-shaped brackets 23 or the like, to provide an air space between the bottom wall 20 or insulation 22 and the bottom of the base plate 30 of the energy receiving surface 28.

More particularly, the energy receiving surface 28 has a base plate 30 which is preferably aluminum and is co-extensive in area with the area of the enclosure forming the solar collector unit 14. An absorber 32 is affixed in space relationship to the base plate 30 by means of L-shaped brackets 40.

In accordance with the present invention, the absorber 32 is uniquely formed of aluminum strips or ribbons 34 which are secured or affixed together to form semi-elliptical or oval shaped individual absorbers which, when fully assembled, form a honeycomb-like pattern. In fabricating the absorber 32, the aluminum strips or ribbons 34, in spaced relationship along the length thereof, are cut to form notches 36. The individual aluminum strips or ribbons 34 then are placed in a fixture or jig which functions to automatically shape the individual ones of the aluminum strips or ribbons 34 so that they, in association with another one of the aluminum strips or ribbons 34, form the described semi-elliptical or oval absorber. The individual ones of the aluminum strips or ribbons 34 then are secured together to form the absorber 32, by reversely folding the notched material 38 to lock the individual ones of the aluminum strips or ribbons 34 together, as can be best seen in FIGS. 4 and 5, to form an integral structure or absorber 32. The absorber 32 then is affixed to the base plate 30 by affixing the L-shaped brackets 40 to the base plate 30 by means of fastening means such as the rivet 42. The absorber 32 then is affixed to the base plate 30 in spaced relationship to the latter by affixing the absorber 32 to the upstanding leg of the L-shaped brackets 40 with fastening means such as the rivets 44. The absorber 32 is shaped in the described fashion so as to act as a plane normal to the sun over the full solar day, and to dissipate that energy as rapidly as possible by use of turbulents consistent with low drag.

In this respect, for maximum efficiency, in absorbing the solar energy and to dissipate that energy as rapidly as possible by use of turbulents, the aluminum strips or ribbons 34 are of material 0.016 inches thickness, and have a height of 1.4 inches. The individual semi-elliptical or oval absorbers have dimensions of 2.5 inches by 4.25 inches. It is found that the efficiency of the absorber 32 is reduced if the aluminum strips or ribbons 34 vary in thickness from that indicated. If the aluminum strips or ribbons 34 are thinner, the heat exchange function is reduced, and if they are thicker, not only is the cost increased, but weight also becomes a factor. It is also found that turbulence is enhanced by proper plate suspension, and slotting, thereby insuring rapid heat extraction. In this respect, the slots, which result when the aluminum strips or ribbons 34 are notched and the notched material 38 reversely folded, perform the dual function of not only securing the aluminum strips or ribbons 34 together to form the absorber 32, they also permit or cause fluid flow beneath and through the absorber 36 to assist in providing the required turbulence for rapid heat extraction. In this regard also, the absorber 32 for maximum efficiency in creating the required turbulence consistent with low drag to minimize the power required to create a fluid flow through the solar collector unit, should be spaced 0.1875 inches above the surface of the base plate 30. The base plate 30 and the absorber 32 are provided with a dull black coat to promote absorption of the solar radiant energy. The black coating can, for example, be provided by black paint or a layer of carbon black.

As indicated above, conduits are provided to introduce a heat exchange fluid, generally air, and to receive or collect the fluid after it has been in contact with the energy receiving surface 28. These means are not shown or illustrated, however, such means are conventional in the art, as are the blowers for creating the flow of fluid through the conduits in the solar collector unit 14. In this respect, a fluid flow of approximately 2.5 and 5–6 cubic feet per minute per square foot for heating and grain conditioning, respectively, may be utilized with the solar collector unit to insure high energy extraction at minimum drag cost.

Figure 6:
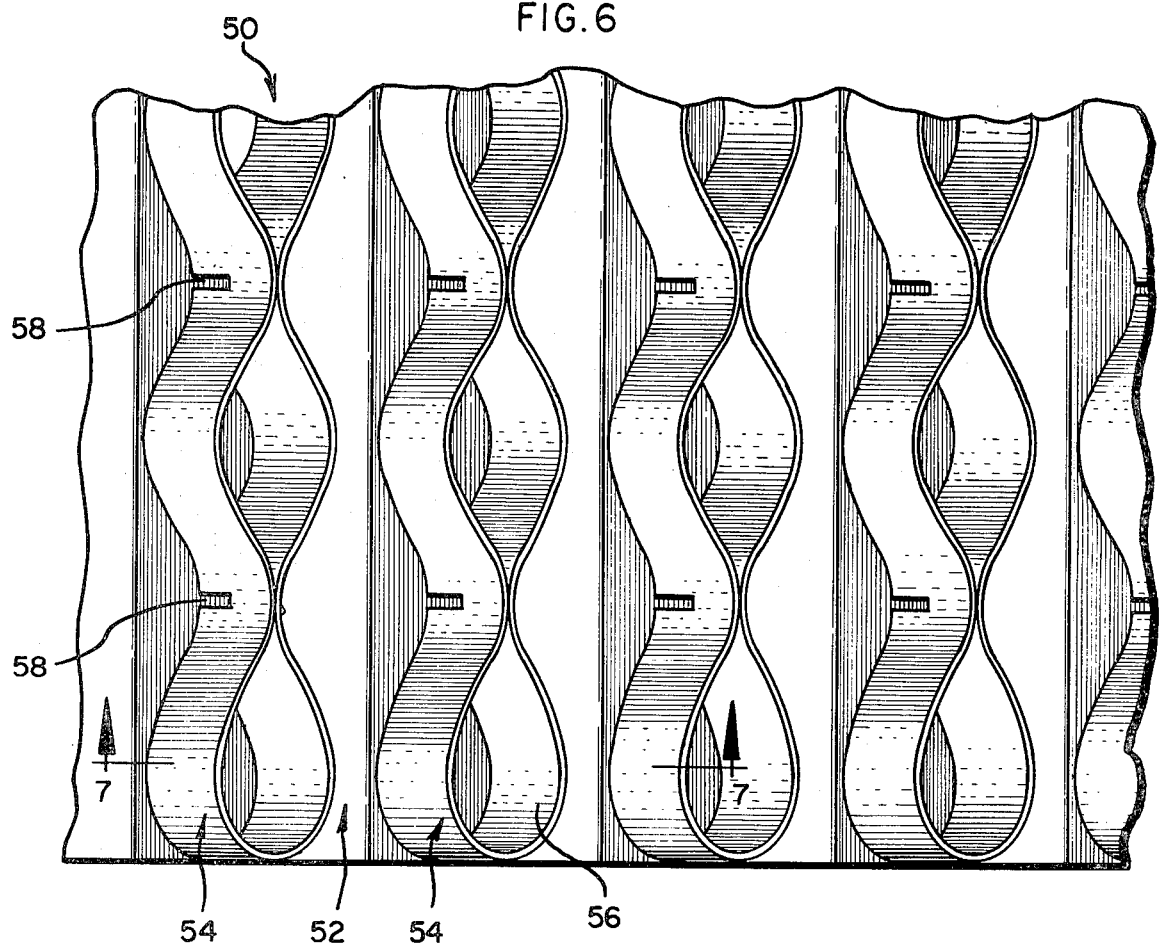
FIG. 6 is a partial top plan view of a stair-step energy receiving surface exemplary of the invention.
Figure 7:
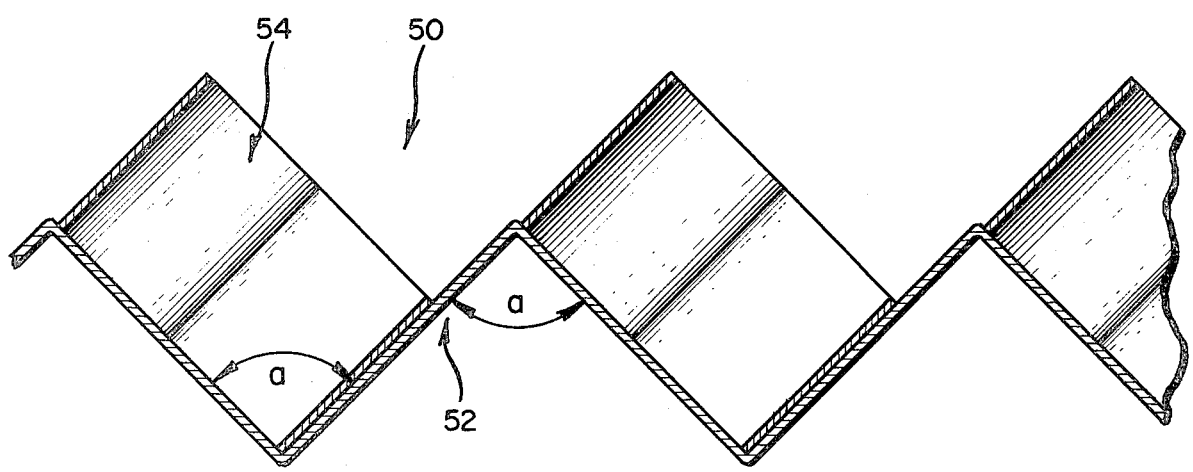
FIG. 7 is a sectional view taken generally along lines 7—7 of FIG. 6.

In FIGS. 6 and 7, there is illustrated an energy receiving surface 50 which is of a stair-step design that permits the energy receiving surface to stand or lay at nearly any angle and have its absorber surface pointed directly toward the winter sun, for maximum heat gain. In this case, it can be seen that the base plate 52 of the energy receiving surface 50 is folded in a stair-step fashion to form angles "a" which are determined in accordance with, for example, the pitch of a roof on a building, so that the absorbers 54 affixed to the base plate 52 point directly toward the sun. Accordingly, by folding the base plate 52 in this stair-step fashion, the efficiency of the absorbers 54 in the energy receiving surface is maximized for maximum heat gain.

In this case, individual absorbers 54 are affixed to the respective steps of the base plate 52. Each of these individual absorbers 54 are essentially formed in the manner described above utilizing aluminum strips or ribbons 56 provided with notches 58, with the notched material being reversely folded to secure the aluminum strips or ribbons 56 together to form the individual semi-elliptical or oval absorbers. In this case also, a single extended length of aluminum strip or ribbon 56 can be utilized and doubled over upon itself and secured together to form the individual absorbers 54.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A radiant solar energy collector comprising, in combination:
   a box-like enclosure including a bottom wall, side walls and a cover transparent to radiate energy, said enclosure forming an essentially sealed conduit through which a heat exchange fluid is caused to flow;
   insulation on said bottom wall;
   an energy receiving surface disposed within said enclosure in spaced relationship from said bottom wall and said insulation on said bottom wall, said energy receiving surface comprising a base plate and an absorber comprising a plurality of aluminum strips, said aluminum strips being notched in spaced relationship along the lengths thereof and affixed together to form individual absorber elements of a semi-elliptical shape by bending said strips and securing associated ones of said strips together by reversely folding the notched material thereof against said associated ones of said strips, whereby an absorber having a plurality of individual absorber elements in a honeycomb-like design is provided;
   said energy receiving surface being coated with a dull black coat to promote absorption of solar radiant energy;
   said absorber being affixed to said base plate 0.1875 inches above the top surface thereof; and
   wherein said aluminum strips are 0.016 inches in thickness and are 1.4 inches in height, each of said individual semi-elliptical absorber elements having dimensions of 2.5 inches by 4.25 inches.

2. The radiant solar energy collector of claim 1, wherein said base plate is folded in a stair-step fashion and an absorber is affixed to each of the respective steps thereof, whereby said absorbers can be caused to lay at an angle and have the absorbing surface thereof pointed directly toward the source of radiant energy regardless of the pitch of the surface to which said collector is affixed.

* * * * *